United States Patent [19]

Nakano et al.

[11] Patent Number: 4,986,967

[45] Date of Patent: Jan. 22, 1991

[54] FURNACE STRUCTURE FOR CERAMIC POWDER PRODUCTION

[75] Inventors: Kazuhiko Nakano; Norio Matsuda, both of Osaka; Mitsutoshi Murase; Hideaki Murakami, both of Ehime, all of Japan

[73] Assignee: Sumitomo Chemical Company, Limited, Osaka, Japan

[21] Appl. No.: 163,665

[22] Filed: Mar. 3, 1988

[30] Foreign Application Priority Data

Mar. 3, 1987 [JP] Japan ................................. 62-49591

[51] Int. Cl.$^5$ ........................... F27D 3/04; F27D 5/00
[52] U.S. Cl. ..................................... 422/188; 422/220; 422/311; 34/192; 34/195; 34/206; 34/238
[58] Field of Search ............... 422/176, 188, 191, 195, 422/220, 311; 34/191–192, 194–195, 238, 204; 423/344; 501/97

[56] References Cited

U.S. PATENT DOCUMENTS

| | | | |
|---|---|---|---|
| 401,992 | 4/1889 | Bang et al. | 422/188 X |
| 1,779,092 | 10/1930 | Harter | 422/188 X |
| 1,892,319 | 12/1932 | Roth | 34/191 X |
| 3,475,133 | 10/1969 | Wartenberg | 422/188 |
| 4,610,864 | 9/1986 | Kuramoto et al. | 423/344 |
| 4,812,291 | 3/1989 | Friemel et al. | 422/30 |
| 4,825,335 | 6/1985 | Tanaka et al. | 423/344 |

FOREIGN PATENT DOCUMENTS 404104 10/1924 Fed. Rep. of Germany.
935747 11/1955 Fed. Rep. of Germany.

OTHER PUBLICATIONS

Patent Abstracts of Japan, vol. 10, No. 120 (C-343)[2177], 6th May 1986; and JP-A-60 246 211 (Hitachi Kinzoku K. K.) 05-12-1985.

Primary Examiner—Robert J. Warden
Assistant Examiner—Jeffrey R. Snay
Attorney, Agent, or Firm—Sughrue, Mion, Zinn, Macpeak & Seas

[57] ABSTRACT

In a furnace which allows a feed powder or granules in a stack of trays on a base plate to be reacted with a reactive gas, the improvement wherein each of the trays has a cutout or an opening providing a passage for the reactive gas or the produced gas both at the top of one side wall and in the bottom wall to the opposite side of the tray, the base plate having an opening through which the reactive gas is introduced or the produced gas is discharged.

3 Claims, 3 Drawing Sheets

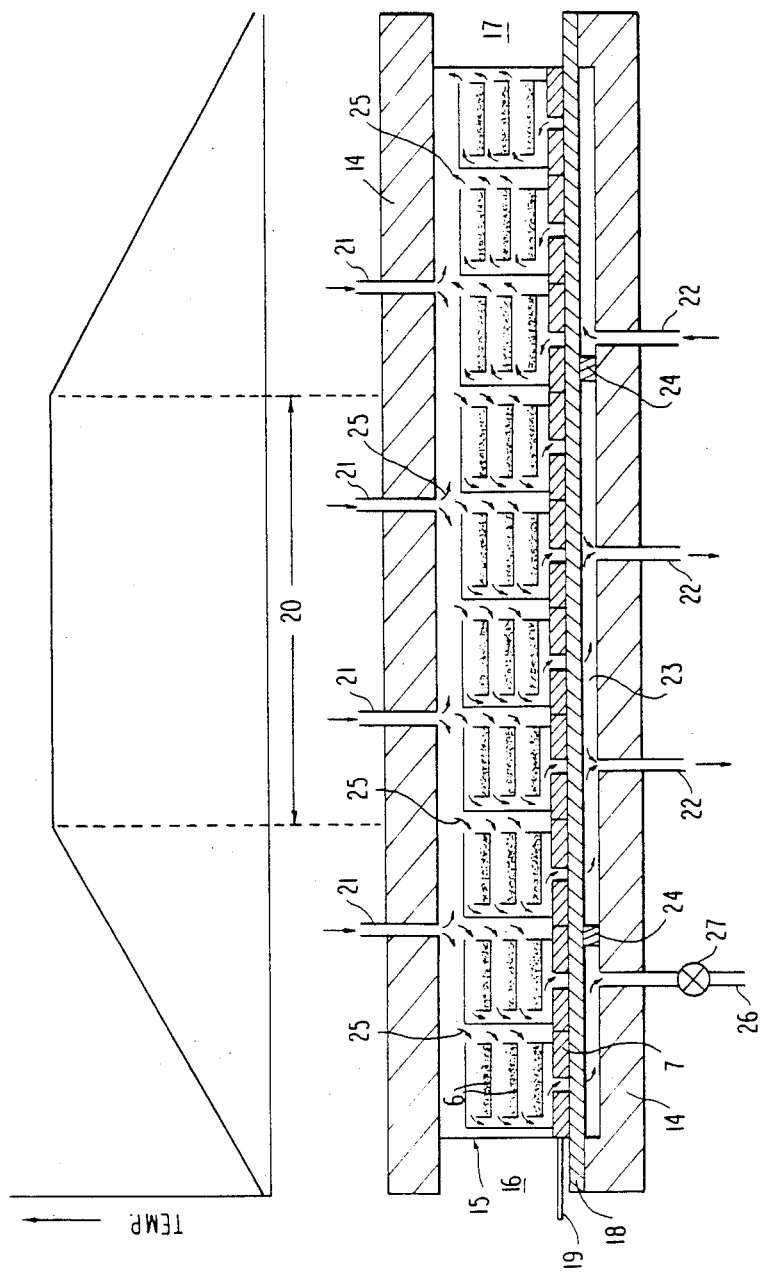

FURNACE STRUCTURE FOR CERAMIC POWDER PRODUCTION

FIELD OF THE INVENTION

The present invention relates to a reactor which allows a feedstock in the form of a powder or granules to react efficiently with a reactive gas.

BACKGROUND OF THE INVENTION

Nitrides such as silicon nitride and aluminum nitride, and oxynitrides such as silicon oxynitride, aluminum oxynitride and Sialon are reputed for their excellent mechanical and thermal properties. Silicon nitride has high resistance to heat and thermal shock. Having high strength both at ambient and elevated temperatures, silicon nitride holds much promise as one of the high-strength heat-resistant materials or high-precision wear-resistant materials that can be used to manufacture heat engines (e.g., diesel engines and gas turbines) that are lighter in weight and adapted to operation with higher efficiency while withstanding temperatures higher than those permitted by the conventional products. Aluminum nitride not only has high heat conductivity; it also exhibits excellent electrical properties such as high insulation resistance, breakdown voltage and dielectric constant, as well good mechanical properties such as high strength. Having these features, aluminum nitride has drawn researchers' attention as a material suitable for making high thermal conductive substrates and packaging.

The properties of the nitrides illustrated above and oxynitrides depend on the properties of the powder from which they are produced, so it is strongly desired to develop fine powders that have good sinterability and which can be obtained as high-purity and homogeneous products.

Nitride and oxynitride powders can be synthesized by direct nitridation of metals, reductive nitridation of oxides, pyrolysis of organometallic compounds containing nitrogenous components such as imides, or by gas-phase reaction with chlorides or some other suitable compounds. Among these methods, reductive nitridation of oxides is best suited to the purpose of preparing inexpensive but high-quality fine powders on an industrial scale.

In the reductive nitridation of oxides, it is common practice to perform a nitridation reaction on a powder mixture of silicon oxide or alumina and carbon in stacked trays by allowing a reactive gas such as nitrogen to pass through the trays. For successful production of the high-quality powders of nitrides or oxynitrides on an industrial scale, it is important that the reactive gas such as nitrogen be permitted into the individual trays in an efficient and uniform way and that the supplied gas be smoothly discharged from the trays after having participated in the desired reaction.

In conventional furnaces employed in the reductive nitridation of oxides, trays each having cutouts either in the top of two opposite side walls or of the four side walls are stacked on a base plate, and a reactive gas is introduced into the furnace at one end and discharged therefrom at the other end. In this method which is generally referred to as a "stacked tray" method, most of the reactive gas permitted into the furnace flows outside the walls of the stacked trays, and only part of it will flow into the trays, and in order to ensure that the reaction will take place to a satisfactory extent, it has been necessary to supply the reactive gas in an amount much greater than is theoretically required. As a further problem, it is difficult to allow a constant volume of reactive gas to be fed uniformly into each of the stacked trays, and this has caused variations in the quality of the reaction product from tray to tray.

SUMMARY OF THE INVENTION

An object, therefore, of the present invention is to provide a furnace in which a feed powder or feed granules loaded in trays stacked on a base plate are reacted with a reactive gas and which is improved as regards the structure of the trays and base plate in such a way that the reactive gas introduced into the furnace can be evenly distributed among the stacked trays in an efficient manner and that the reactive gas will flow smoothly through the individual trays.

This object of the present invention can be attained by employing a plurality of stacked trays each of which has a cutout or an opening providing a passage for the reactive gas or the produced gas both at the top of one side wall and in the bottom of the opposite side of the tray, as well as a base plate having an opening through which the reactive gas is introduced or the produced gas is discharged.

BRIEF DESCRIPTION OF THE DRAWINGS

FIG. 5 shows a longitudinal section of a pusher-type furnace according to still another embodiment of the present invention.

DETAILED DESCRIPTION OF THE INVENTION

The furnace of the present invention is suitable for use in carrying out a reaction between a feed in powder or granular form and a gas. The furnace is particularly useful as a nitridation furnace for allowing a feed powder or granules in stacked trays to be reacted with a reactive gas such as nitrogen in the synthesis of the powder of a nitride (e.g., silicon nitride or aluminum nitride) or an oxynitride (e.g., silicon oxynitride, aluminum oxynitride or Sialon) by reductive nitridation of an oxide.

The furnace of the present invention may be a batch-type furnace or a continuous furnace such as a pusher-type furnace in which a plurality of base plates supporting stacked trays are successively pushed through the furnace as they are guided on rails.

Figure 1A:
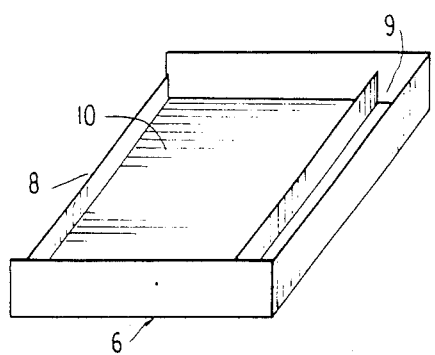
FIG. 1(A) is a perspective view of a tray to be employed in a furnace according to one embodiment of the present invention.

The structures of a tray and a base plate for use in the present invention are shown in FIGS. 1(A) and (B), respectively. The tray shown by 6 is usually made of graphite, silicon carbide, silicon nitride, aluminum nitride or some other suitable material.

Figure 2:
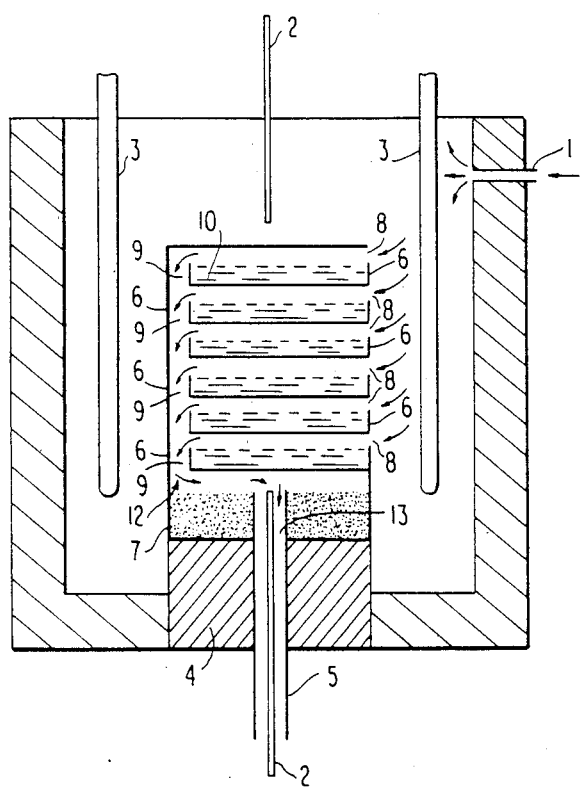
FIG. 2 is a cross-sectional view of a batch-type furnace according to one embodiment of the present invention.

FIG. 2 is a cross section of a batch-type furnace according to one embodiment of the present invention in which a plurality of trays 6 are stacked on a base plate 7. In this figure, 1 is a reactive gas inlet port, 2 is a thermocouple for effecting temperature control, 3 is a graphite heater, 4 is a gate through which the trays are transferred to and from the furnace, 5 is a duct through which the gas produced during reaction is discharged, 6 is a tray loaded with a feed powder or granules, and 7 is a base plate. The tray has cutout 8 in the top of a side wall, as well as an opening 9 in the bottom wall 10 adjacent the opposite side wall of the tray from cutouts. After the feed powder or granules are placed on bottom wall 10, the necessary number of trays 6 are stacked in such a way that the opening 9 in the bottom of one tray is in registry with the opening in the bottom wall 10 of the tray positioned on top of it. As a result, the bottom wall openings 9 in the stacked trays 6 provide a continuous passage 12 for the gas produced during the reaction. A reactive gas introduced into the furnace through the inlet port 1 is guided into each tray 6 through the cutout 8 and flows over a feed powder or granules 11. At the same time, the reactive gas diffuses into the feed powder or granules to initiate the intended reaction. Thereafter, this reactive gas, together with the by-product gas generated during the reaction, is discharged from the furnace via the passage 12 and an exhaust port 13 in the base plate 7.

By virtue of this furnace layout, each of the trays 6 is constantly supplied with a given amount of fresh reactive gas and the by-product gas which often hampers the progress of the intended reaction can be smoothly removed so as to promote a more efficient and uniform reaction. A further advantage is that the potential loss of the reactive gas is substantially reduced since practically all of the reactive gas supplied pass through the trays before discharged from the furnace.

Figure 4:
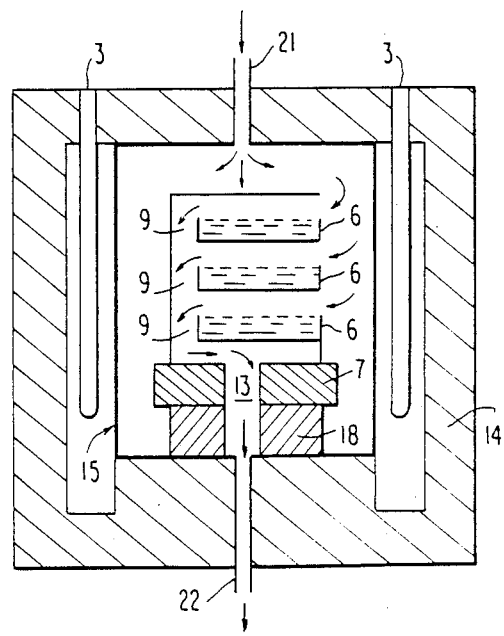
FIG. 4 is a cross-sectional view of the furnace shown in FIG. 3.
Figure 3:
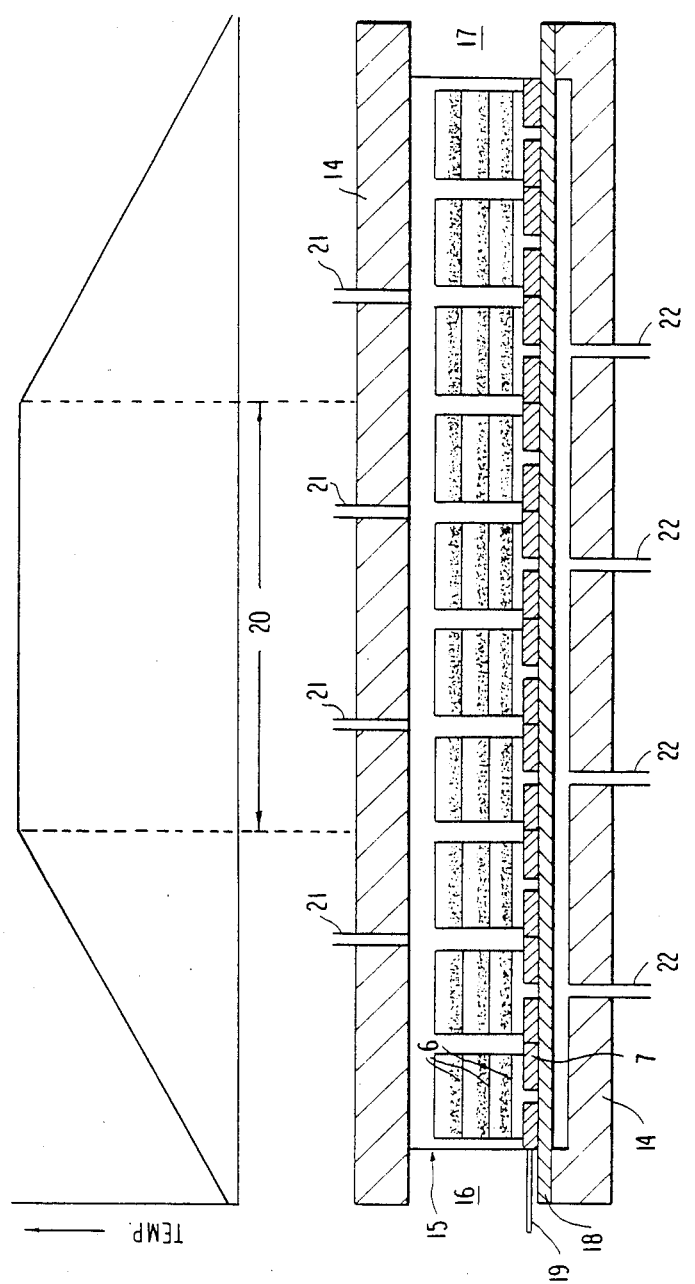
FIG. 3 shows a longitudinal section of a pusher-type furnace according to another embodiment of the present invention.

FIG. 3 shows a longitudinal section of a pusher-type furnace according to another embodiment of the present invention, together with the temperature distribution profile obtained with that furnace. FIG. 4 is a cross-sectional view of the same furnace. Trays and base plates used in this furnace are essentially the same as those depicted in FIGS. 1(A) and (B).

In FIG. 3, a shell 14 in which a muffle 15 is accommodated has reactive gas inlet ports 21 and outlet ports 22 through which the produced gas is to be discharged from the furnace. A tray entrance 16 and an exit 17 are provided on opposite sides of the shell 14 in its longitudinal direction. Rails 18 are laid on the bottom of the muffle 15 along its length so that the base plates 7 can be pushed through the furnace from the entrance 16 to the exit 17. On each of the base plates 7, a plurality of trays 6 each loaded with a feed powder or granules are stacked in such a way that the bottom opening 9 in one tray comes into registry with the opening 9 in the tray positioned on top of it. The base plates 7 carrying a stack of trays 6 are mounted on the rails 18 at the entrance 16 and pushed into the furnace by means of a pusher 19. The base plates 7 already present ahead of these base plates 7 are pushed forward to pass through a soaking zone 20 and further moved toward the exit of the furnace. By repeating this step, the base plates 7 carrying a stack of trays 6 are successively subjected to reaction in the soaking zone 20 and emerge from the furnace through the exit 17.

Figure 1B:
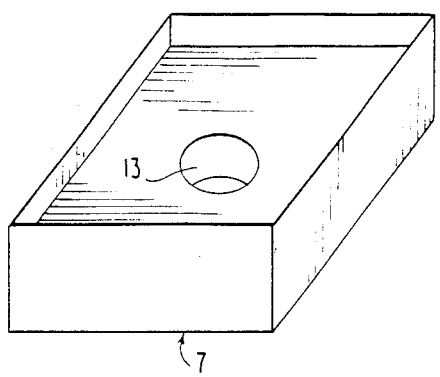
FIG. 1(B) is a perspective view of a base plate to be employed in a furnace according to one embodiment of the present invention.

The basic composition of the pusher-type furnace shown in FIG. 3 is essentially the same as that of a conventional pusher-type furnace, except that the trays 6 and base plates 7 employed have the structures shown in FIG. 1. As a result, the reactive gas introduced into the furnace through the inlet ports 21 successively pass through the trays 6 to be effectively utilized in the reaction before being discharged through the outlet ports 22. This contributes to an improved efficiency in the use of the reactive gas since only a negligible portion of the reactive gas supplied is discharged from the furnace without passing through the trays 6 at all.

The number and position of the reactive gas inlet ports can be varied in accordance with the specific type of reaction intended. Satisfactory results can be attained even when the outlet ports 22 are used as inlet ports for the reactive gas whereas the inlet ports 21 are used as passages through which the gas produced during the reaction is discharged. However, if the feed and the product are highly volatile or in the case where highly volatile by-products are likely to form in large amounts, discharge ports are desirably provided in the bottom of the muffle 15 in order to avoid potential contamination of the interior of the furnace.

FIG. 5 shows another embodiment of the furnace of the present invention, in which an exhaust zone 23 in the bottom of the muffle 15 is divided into a suitable number of sections by means of partitions 24 and the reactive gas is allowed to flow in the directions indicated by arrows 25. In the case where the feed contains moisture or a substance that will vaporize at low temperatures, the layout shown in FIG. 5 is desirable, in which the reactive gas is introduced from the bottom of the muffle 15 in the temperature decreasing zone and is successively passed through the overlying trays 6 to be heated through heat exchange; thereafter, part of the hot reactive gas is introduced into the trays 6 in the soaking zone 20 and utilized in the intended reaction before it is discharged from the furnace; the remainder of the hot reactive gas is introduced into the trays 6 in the temperature-raising zone so as to effect removal of moisture and evaporable substances before it is discharged through an exhaust port 26. In case of adopting this layout, a flow regulating valve 27 must be fitted on the exhaust port 26.

The furnace of the present invention allows a reactive gas to be uniformly supplied into each of the trays loaded with a feed powder or granules. In addition, the amount of reactive gas that is simply discharged from the furnace without taking part in the reaction can be reduced to such a low level that an intended reaction product of high quality can be consistently obtained in an efficient way. If the furnace of the present invention is employed, nitrides or oxynitrides such as silicon nitride, aluminum nitride, silicon oxynitride, aluminum oxynitride and Sialon can be produced by the reductive nitridation of oxides more efficiently than when the conventional furnaces are used.

The design concept of this furnace is also applicable to various oxidizing furnaces and sintering furnaces.

While the invention has been described in detail and with reference to specific embodiments thereof, it will be apparent to one skilled in the art that various changes and modifications can be made therein without departing from the spirit and scope thereof.

What is claimed is:

1. In a furnace structure for ceramic powder production including:
   a stack of trays within the furnace, each tray having laterally opposed side walls, longitudinally opposed end walls and a bottom wall extending between said side walls and between said end walls, said bottom wall for supporting said ceramic powder or granules thereon, and means for supplying fresh reactive gas to the furnace and for removing reactive byproduct gas therefrom, the improvement comprising:

cutouts at the top of said side walls at one side of said trays to permit reactive gas to flow in parallel through said cutouts and over said ceramic powder or granules in respective trays, said side walls at the opposite side of said trays closing off said trays on said opposite side, said bottom walls each having an opening therein extending along the side wall at said opposite side, a retaining wall in each of said trays projecting vertically from the bottom wall and extending along said bottom wall opening from one end wall to the other and being of a vertical height less than the height of the side wall closing off each of said trays on said opposite side, said bottom wall openings aligning in said stack to define a continuous reactive gas passage, and a base plate underlying said stack of trays supporting said trays and having an opening therein communicating with said continuous reactive gas passage defined by bottom wall openings of said trays through which said reactive gas flows, said bottom wall openings being in vertical alignment and said cutouts being within said side walls on the same side of the stack of trays for receiving said reactive gas, whereby each of said trays is constantly supplied with a given amount of fresh reactive gas and reactive byproduct gas is smoothly removed from each tray via said continuous reactive gas passage, thereby promoting efficient and uniform reaction.

2. The furnace structure for ceramic powder production of claim 1, wherein the furnace is a bath-type furnace.

3. The furnace structure for ceramic powder production of claim 1, wherein the furnace is a pusher-type furnace.

* * * * *